United States Patent

Iwata

Patent Number: 5,236,670
Date of Patent: Aug. 17, 1993

[54] DEVICE FOR PURIFYING FUEL
[75] Inventor: Yosihiro Iwata, Kyoto, Japan
[73] Assignee: Yamada Kohsan Co., Ltd., Kyoto, Japan; a part interest
[21] Appl. No.: 893,391
[22] Filed: Jun. 4, 1992
[30] Foreign Application Priority Data
  Jan. 17, 1992 [JP] Japan .................. 4-25929
[51] Int. Cl.⁵ .................................. B01J 19/12
[52] U.S. Cl. ...................... 422/186.04; 422/186; 585/899; 44/629; 44/904
[58] Field of Search ............ 422/186.01, 186.04, 422/120, 121, 22, 900; 585/899; 44/629, 904

[56] References Cited

U.S. PATENT DOCUMENTS

| 3,830,621 | 8/1974 | Miller | 431/356 |
|---|---|---|---|
| 4,188,296 | 2/1980 | Fukita | 210/222 |
| 4,315,895 | 2/1982 | Bramer et al. | 422/171 |
| 4,569,737 | 2/1986 | Sakata | 585/899 |
| 4,716,024 | 12/1987 | Pera | 422/186.01 |
| 4,865,747 | 9/1989 | Larson et al. | 210/695 |
| 4,933,151 | 6/1990 | Song | 422/186.01 |
| 4,975,406 | 12/1990 | Frestad et al. | 502/302 |
| 4,985,213 | 1/1991 | Ooe et al. | 422/186.01 |
| 5,059,743 | 10/1991 | Sakuma | 585/899 |

FOREIGN PATENT DOCUMENTS 62-233468 1/1986 Japan .

Primary Examiner—Donald P. Walsh
Assistant Examiner—Daniel Jenkins
Attorney, Agent, or Firm—Flynn, Thiel, Boutell & Tanis

[57] ABSTRACT

A device for purifying fuel is safe and can be easily controlled, and is of low cost by applying a low frequency, low voltage and low current signal to fuel during the supply thereof. The device comprises a fuel supply pipe interposed between a fuel tank and an engine, a fuel communication pipe interposed in the fuel supply pipe, a conductive coil wound around a periphery of the fuel communication pipe, a protective cover for covering the conductive coil, and an AC signal generator connected to a battery and the conductive coil for generating a low frequency, low voltage and low current signal to the conductive coil.

4 Claims, 2 Drawing Sheets

5,236,670

DEVICE FOR PURIFYING FUEL

BACKGROUND OF THE INVENTION

1. Technical Field

The present invention relates to a device for improving fuel such as gasoline, gas oil or heavy oil used in an engine of an automobile etc. so as to purify exhaust gas.

2. Prior Art

A conventional device for purifying fuel is disclosed in Japanese Patent Laid-Open Publication No. 62-233468 wherein the device comprises a fuel tank, a conductive coil housed in the fuel tank and covered by an electrical insulator which is formed of an oil resistant and acid resistant material, and a high voltage AC power source circuit housed in the fuel tank for applying a low frequency high voltage AC signal to the conductive coil.

However, there are drawbacks in the conventional device. Firstly, the device is very dangerous since the high voltage AC power is used. Secondly, it is not easy to control the device since the voltage changes as the liquid level changes in the fuel tank during consumption of fuel. Thirdly, it takes much time to purify the exhaust gas at a time since much fuel should be disposed of. Fourthly, it is difficult to attach the conductive coil to or detach the same from the fuel tank.

SUMMARY OF THE INVENTION

The present invention has been made to solve the drawbacks of the conventional device. It is an object of the present invention to provide a device for purifying fuel which is safe and can be easily controlled, and is of low cost by applying a low frequency, low voltage and low current signal and applying such signal to fuel during the supply thereof.

The device for purifying fuel comprises a fuel tank, a conductive coil wound around a fuel communication synthetic resin tube which is interposed in a fuel supply pipe between the fuel tank and an engine, a protecting cover for covering the outer periphery of the conductive coil, and an AC signal generator which is connected to a battery and to the conductive coil for generating a signal having low frequency, low voltage and low current and applying the thus generated signal to the conductive coil.

The device for purifying fuel further comprises a purifier disposed in an exhaust pipe, the purifier having therein multiple maze of tubes formed of magnetized ceramic.

Since the fuel is influenced by an electrostatic induction field from the conductive coil upon reception of the signals having low frequency, low voltage and low current from the AC signal generator, it is possible to cause molecular variation in the fuel to thereby increase dissolved oxygen in the fuel whereby NOx or CO contained in the exhaust gas is remarkably reduced. The influence by the electrostatic induction field is generated in the fuel supply pipe between the fuel tank and the engine, the electrostatic induction field influences concentrically and uniformly to the entire fuel in the fuel supply pipe so that the fuel is improved. Furthermore, since the purifier is attached to the exhaust pipe of the engine, the exhaust gas is more purified.

PREFERRED EMBODIMENT OF THE INVENTION

Figure 1:
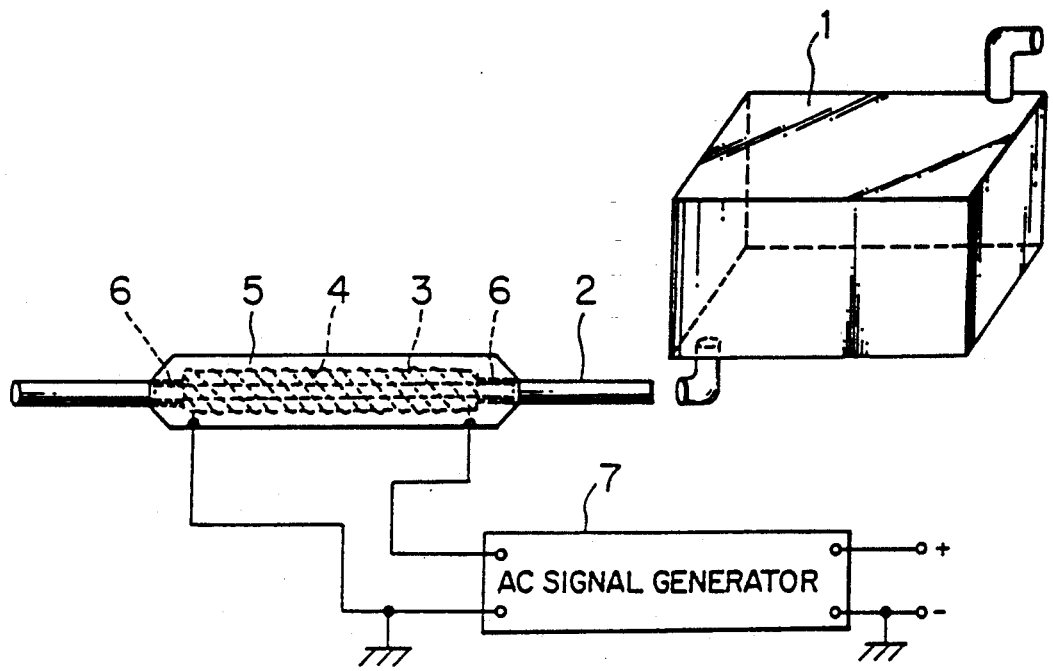
FIG. 1 is a view showing an arrangement of a device for purifying fuel according to a preferred embodiment of the present invention.

A device for purifying fuel according to a preferred embodiment of the present invention will be described hereinafter with reference to FIGS. 1 to 4.

A fuel supply pipe 2 is disposed between a fuel tank 1 mounted on an automobile, etc. and an engine, not shown, and a fuel communication pipe 3 made of synthetic resin is interposed in the fuel supply pipe 2. A conductive coil 4 is wound around an outer periphery of the fuel communication pipe 3 and is covered by a protective cover 5 so that the coil is prevented from getting out of position or from being damaged due to the vibration of the engine, etc. The fuel communication pipe 3 has screw portions 6 and 6 at both ends thereof and is connected to the fuel supply pipe 2 at the screw portions 6 and 6. An AC signal generator 7 is connected to the positive and negative terminals of a battery mounted on the automobile, etc. at the input terminals thereof and to the conductive coil 4 at the output terminals thereof.

Figure 2:
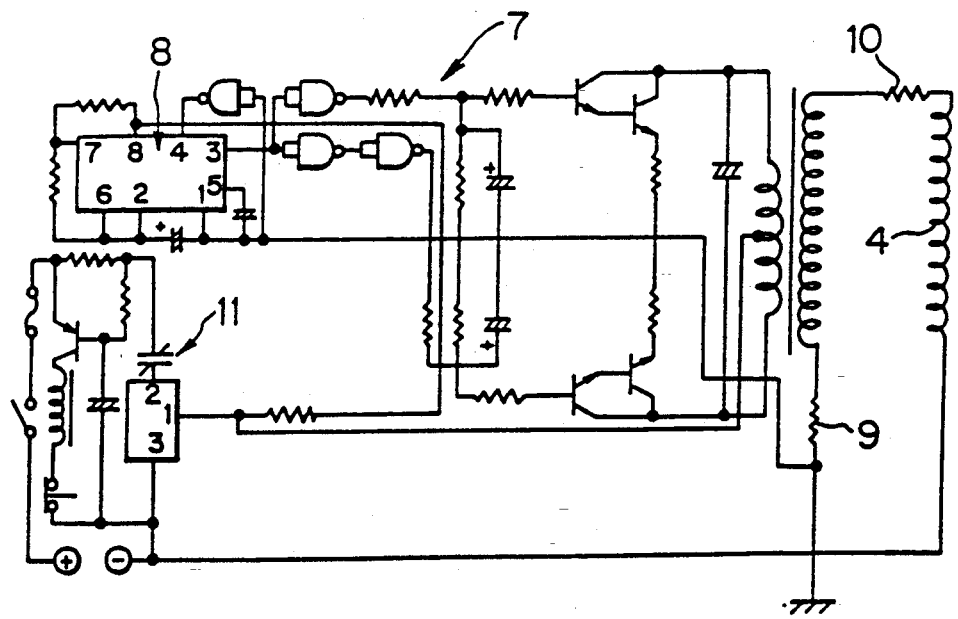
FIG. 2 is a circuit diagram of the device for purifying fuel.

A typical circuit diagram of the AC signal generator 7 is illustrated in FIG. 2 in which the AC signal generator 7 is connected to the conductive coil 4. The AC signal generator 7 generates low frequency signals which ranges from 30 Hz to 130 Hz by an IC circuit 8. When a resistor 9 or 10 is appropriately selected, a suitable current among currents ranging from 250 $\mu$A to 1.5 mA can be selectively generated in the AC signal generator 7 depending on the kind of fuel. Furthermore, the length of the conductive coil is selectively determined and a suitable voltage among voltages ranging from 0.05 V to 1.5 V can be selectively generated in the AC signal generator 7 depending on the kind of fuel. A regulator 11 can turn off the entire circuit of the AC signal generator 7 when an anomalous current is supplied to the conductive coil 4 due to electric short, etc.

A test of the device for purifying fuel having the arrangement set forth above revealed as follows. In case of the engine using heavy oil or gas oil, the signal issued by the AC signal generator is preferable to have the frequency ranging from 100 to 130 Hz, the voltage ranging from 0.05 V to 1 V and the current ranging from 250 $\mu$A to 1 mA so as to reduce the NOx in the exhaust gas and comparatively reduce the increase of the dissolved oxygen in the fuel. In case of the engine using gasoline, the signal is preferable to have the frequency ranging from 30 to 60 Hz, the voltage ranging from 0.05 V to 1.5 V and the current ranging from 250 $\mu$A to 1.5 mA so as to reduce the NOx in the exhaust gas and comparatively increase the dissolved oxygen in the fuel.

Figure 3:
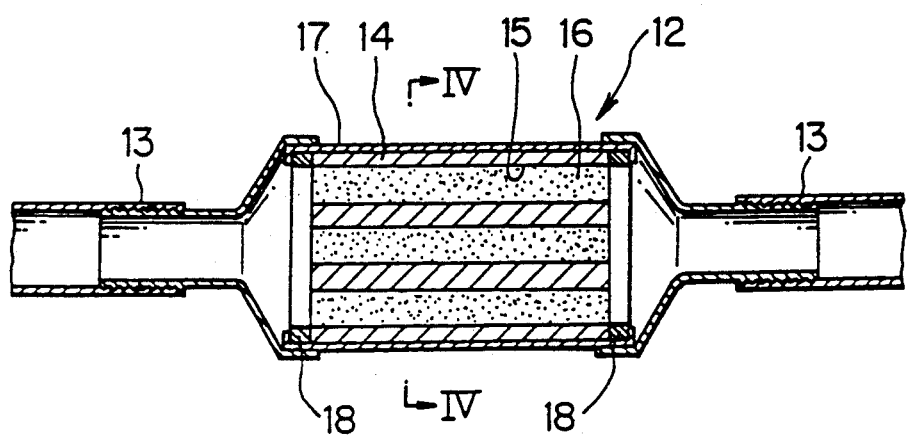
FIG. 3 is a cross-sectional view of the device for purifying fuel in FIG. 1.
Figure 4:
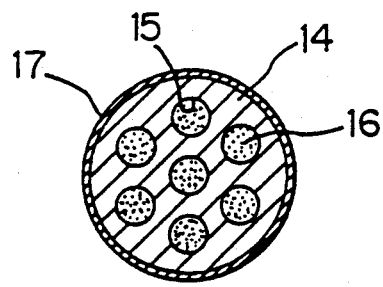
FIG. 4 is a cross-sectional view of the device for purifying fuel taken along IV—IV of FIG. 3.

In FIGS. 3 and 4, a purifier 12 is preferable to be disposed in the midway of an exhaust pipe 13 of the engine. The purifier 12 is formed of a magnetized ceramic member 14 in which multiple perforated holes 15 are provided. Granular materials 16 such as sand are filled in the perforated holes 15 like a maze. When the exhaust gas passes through the maze formed by the granular material 16, it is purified. The magnetized ceramic member 14 is formed by molding clay and heating the molded clay at the temperature of about 800° C. It is more preferable that ceramic member 4 is further heated at about 1300° C. while the granular materials 16 are filled in the perforated holes 15. The ceramic member 14 is supported by metal packings 18 at both ends thereof and has an outer periphery 17 formed of metal. When the exhaust gas passes through the purifier 12 in the midway of the exhaust pipe 13, it is purified by the purifier 12 by reduction of NOx or CO in the components thereof and is exhausted as a low-pollution gas to the atmosphere.

Furthermore, since the fuel is influenced by an electrostatic induction field from the conductive coil upon reception of the signals having low frequency, low voltage and low current from the AC signal generator, it is possible to cause molecular variation in the fuel to thereby increase the dissolved oxygen in fuel whereby NOx or CO contained in the exhaust gas is remarkably reduced. As a result, it is very advantageous to the anti-pollution measures. Furthermore, the present device is safe and of low cost because of utilizing low voltage. Since the electrostatic induction field is generated in the fuel supply pipe between the fuel tank and the engine, the electrostatic induction field influences concentrically and uniformly to the entire fuel in the fuel supply pipe so that fuel is improved without taking additional time. Furthermore, since the purifier is attached to the exhaust pipe of the engine, the exhaust gas is more purified and more advantageous for the anti-pollution measures.

What is claimed is:

1. A device for purifying fuel comprising:
   a fuel supply pipe interposed between a fuel tank and an engine;
   a fuel communication pipe interposed in the fuel supply pipe;
   a conductive coil wound around a periphery of the fuel communication pipe;
   a protective cover for covering the conductive coil; and
   an AC signal generator means connected to a battery and the conductive coil for generating a signal having a frequency ranging from 30 Hz to 130 Hz, a voltage ranging from 0.05 V to 1.5 V and a current ranging from 250 $\mu$A to 1.5 mA, said signal applied to the conductive coil to cause molecular variation in the fuel passing through the communication pipe to increase dissolved oxygen in the fuel.

2. A device according to claim 1, wherein the AC signal generator means generates a signal having a frequency ranging from 100 Hz to 130 Hz, a voltage ranging from 0.05 V to 1 V and a current ranging from 250 $\mu$A to 1 mA in case that the engine uses heavy oil or gas oil.

3. A device according to claim 1, wherein the AC signal generator means generates a signal having a frequency ranging from 30 Hz to 60 Hz, a voltage ranging from 0.05 V to 1.5 V and a current ranging from 250 $\mu$A to 1.5 mA in case that the engine uses gasoline.

4. A device according to claim 1 further comprising a purifier disposed in the midway of an exhaust pipe of the engine, the purifier composed of a magnetized ceramic member in which multiple perforated holes are provided, the perforated holes having granular materials therein.

* * * * *